United States Patent
Collins et al.

(10) Patent No.: US 10,545,950 B2
(45) Date of Patent: Jan. 28, 2020

(54) ATOMIC APPLICATION OF MULTIPLE UPDATES TO A HIERARCHICAL DATA STRUCTURE

(71) Applicant: Amazon Technologies, Inc., Seattle, WA (US)

(72) Inventors: Brian Collins, Seattle, WA (US); Zachary Mohamed Shalla, Seattle, WA (US); Marvin Michael Theimer, Seattle, WA (US); John Petry, Seattle, WA (US); Michael Hart, Seattle, WA (US); Serge Hairanian, Newcastle, WA (US); Anders Samuelsson, Redmond, WA (US); Salvador Salazar Sepulveda, Seattle, WA (US); Ji Luo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 576 days.

(21) Appl. No.: 15/276,714

(22) Filed: Sep. 26, 2016

(65) Prior Publication Data
US 2018/0089250 A1   Mar. 29, 2018

(51) Int. Cl.
G06F 16/23   (2019.01)
G06F 16/21   (2019.01)
G06F 16/28   (2019.01)

(52) U.S. Cl.
CPC ........ *G06F 16/2365* (2019.01); *G06F 16/211* (2019.01); *G06F 16/2343* (2019.01); *G06F 16/282* (2019.01)

(58) Field of Classification Search
CPC ............... G06F 17/30589; G06F 16/27; G06F 16/1844; G06F 16/2358; G06F 16/2379;
(Continued)

(56) References Cited

U.S. PATENT DOCUMENTS

| 5,737,559 A | 4/1998 | Orton et al. |
| 5,940,839 A | 8/1999 | Chen et al. |

(Continued)

OTHER PUBLICATIONS

Markus Vilcinskas, "What is Azure Active Directory?", Retrieved from URL: https://azure.microsoft.com/en-us/documentation/articles/active-directory-whatis/, Published on Aug. 23, 2016, pp. 1-4.

*Primary Examiner* — Robert W Beausoliel, Jr.
*Assistant Examiner* — Pedro J Santos
(74) *Attorney, Agent, or Firm* — Robert C. Kowert; Kowert, Hood, Munyon, Rankin & Goetzel, P.C.

(57) ABSTRACT

Multiple edits to a hierarchical data structure may be atomically applied. A request to perform modifications with respect to a portion or the entire hierarchical data structure may be received. A copy of the requested portion of the hierarchical data structure may be created separate from the hierarchical data structure. The portion of the hierarchical data structure may remain available for read access. Modifications may be applied to the copy of the portion of the hierarchical data structure. In response to a request to commit the modifications to the portion of the hierarchical data structure, the copy of the portion of the hierarchical data structure may atomically replace the portion of the hierarchical data structure.

20 Claims, 9 Drawing Sheets

(58) Field of Classification Search
CPC ... G06F 16/2365; G06F 16/252; G06F 16/284
USPC .......... 707/705, E17.005, E17.032, E17.007,
707/610, 803, 802, 999.008
See application file for complete search history.

(56) References Cited

U.S. PATENT DOCUMENTS

| | | | |
|---|---|---|---|
| 6,272,488 B1 | 8/2001 | Chang et al. | |
| 6,523,032 B1 * | 2/2003 | Sunkara | G06F 16/24532 |
| 6,625,602 B1 | 9/2003 | Meredith et al. | |
| 6,826,570 B1 * | 11/2004 | Eshel | G06F 16/1774 |
| 7,136,867 B1 * | 11/2006 | Chatterjee | G06F 16/9027 |
| | | | 713/171 |
| 7,383,285 B1 | 6/2008 | Pal et al. | |
| 2004/0225988 A1 * | 11/2004 | Petunin | G06F 17/5068 |
| | | | 716/119 |
| 2016/0283540 A1 * | 9/2016 | Barber | G06F 16/2336 |

* cited by examiner

ATOMIC APPLICATION OF MULTIPLE UPDATES TO A HIERARCHICAL DATA STRUCTURE

Large systems with many users often require complex management schemes in order to ensure that both users and system components are appropriately utilized for performing operations. Instead of reconfiguring or redesigning system components each time changes in the appropriate actions or behaviors taken by system components on behalf of users are to be implemented, resource management systems have been developed to allow for the separate management of actions and behaviors that may be performed by system components. Access privileges, for instance, may be defined for one or multiple users with respect to certain system components in a resource management system so that when access requests from the users directed to the certain system components are received, the resource management system may indicate to the system components which requests may or may not be performed based on the defined access privileges. In this way, resource management systems reduce the costs associated with modifying or enforcing actions or behaviors of system components by reducing the number of changes that have to be implemented directly at system components. However, as the size of systems continues to increase, the ability of resource management systems to cope with growing numbers of system components in order to define and apply appropriate actions or behaviors for the system components may become less efficient without further capabilities to optimally manage system components.

Figure 1:
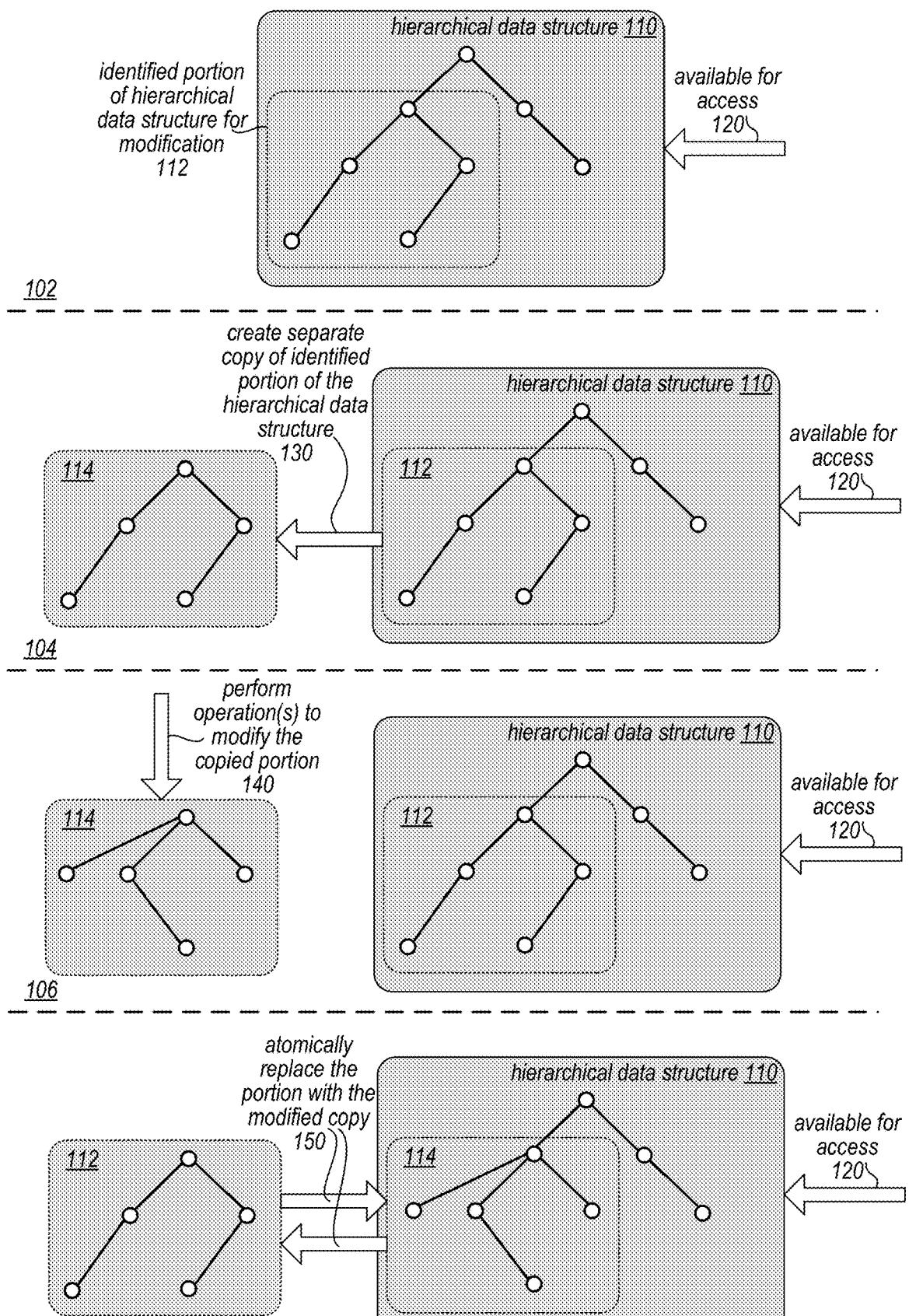
FIG. 1 is a logical block diagram illustrating atomic application of multiple updates to a hierarchical data structure, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of atomic application of multiple updates to a hierarchical data structure are described herein.

Hierarchical data structures provide an optimal way to organize data for a variety of different applications. For example, hierarchical data structures may be a tree, graph, or other hierarchy-based data structure maintained in data storage. Directory storage, for instance, may utilize hierarchical data structures to maintain different locations or paths to data that can be traced back to a single starting destination (e.g., a root directory). Other systems may leverage the relationship information provided by hierarchical data structures to reason over data. For example, managing system resources often involves defining and enforcing the permitted actions, configurations, controls or any other definition of behaviors for the system resources. Security policies, such as access rights or permitted actions for system resources, may be defined and enforced for users of the system resources, for instance. Data describing the resources of a system may be maintained that also describes these permitted behaviors. For example, data objects describing system resources may be maintained to identify policies that indicate the permitted behaviors for the system resources. In order to apply the same policies to multiple resource data objects, a hierarchical data structure may be created for the resource data objects and policies. For instance, a tree structure may be implemented that arranges the resource data objects in groups, directories, or other sets of resource data objects which apply those policies inherited along the path of the tree structure from the resource data object to the root of the tree structure. In this way, policies applied to parent nodes (e.g., the groups, directories, or other set of resource data objects) may be inherited and applied to child nodes (e.g., the resource data objects in the groups, directories, or sets).

While some changes or updates to a hierarchical data structure may involve small numbers of discrete operations, in some scenarios large numbers or sets of updates may need to be performed together to effect changes. If the hierarchical data structure were to be accessed while the set of updates were not all complete, then broken links, incomplete information, contradictory information, or other errors may result. Atomic application of modifications to the hierarchical data structure may be implemented in various embodiments so that incomplete sets of updates are not visible when accessing the hierarchical data structure, preventing errors or other erroneous information that would result. Moreover, the hierarchical data structure may remain available for access during atomic application of the modifications so that utilization of the hierarchical data structure is not blocked for long running sets of modifications.

FIG. 1 is a logical block diagram illustrating atomic application of multiple updates to a hierarchical data structure, according to some embodiments. As illustrated in scene 102, hierarchical data structure 110 is available for access 120 so that information stored in hierarchical data structure as well as information determined by reasoning over the hierarchical data structure (e.g., following paths from child to parent nodes and applying inheritance rules) may be available. A request may be made to perform a set of modifications atomically to a portion 112 (as illustrated in FIG. 1) or the entire data structure 110. As illustrated in scene 104, a separate copy 114 of the identified portion of the hierarchical data structure may be created 130. While the copy is created, hierarchical data structure 110 including portion 112 may still remain available for access. In some embodiments, remaining access may be read access and in some other embodiments both read and write access may remain.

As illustrated in scene 106, operations 140 to modify the copied portion 114 may be performed. In this way, the changes made to portion 114 are not visible when hierarchical data structure 110 is accessed (including portion 112). Modification operations may occur over a period of time from a request to initiate the atomic application of a set of updates to the request to commit the set of updates. In this way, human timescale interactions (e.g., allowing a user to start editing the portion, stop, redo, receive confirmation of updates, and other time variables) may be accounted for without blocking access or imposing strict time limits upon performing atomic application of a set of modifications. As illustrated in scene 108, the set of updates may be committed to hierarchical data structure 110 by atomically replacing 150 portion 112 with the modified copy 114. Atomic replacement does not allow for only partial copying of modifications, but instead ensures that the entire set of changes in the copy are inserted into hierarchical data structure 110 (or as a result of a failure or error, none of copy 114 is inserted). Once the set of modifications are successfully committed, then portion 114 of hierarchical data structure may be made available for read and write access, in those embodiments where write access was restricted upon initiating the application of the set of modifications.

Please note, FIG. 1 is provided as a logical illustration of atomic application of multiple updates to a hierarchical data structure, and is not intended to be limiting as to the physical arrangement, size, or number of components, modules, or devices, implementing a data store, system or clients or the number, type, or arrangements of hierarchies, performance of updates, copy operations or atomic replacements. For example, a portion of a hierarchical data structure that is identified for modification may include multiple, unconnected nodes or subtrees that are all modified as part of the same atomic update.

The specification first describes an example of a provider network implementing multiple different resources as part of offering different services to clients of the provider network. The provider network may also implement a resource management service that maintains different hierarchies of resource data objects for managing provider network resources corresponding to the resource data objects that allow for atomic application of modifications to the hierarchies, according to various embodiments. Included in the description of the example resource management service are various aspects of the example resource management service along with the various interactions between the resource management service, other services in the provider network, and clients of the provider network. The specification then describes a flowchart of various embodiments of methods for atomic application of multiple modifications to a hierarchical data structure. Next, the specification describes an example system that may implement the disclosed techniques. Various examples are provided throughout the specification.

Figure 2:
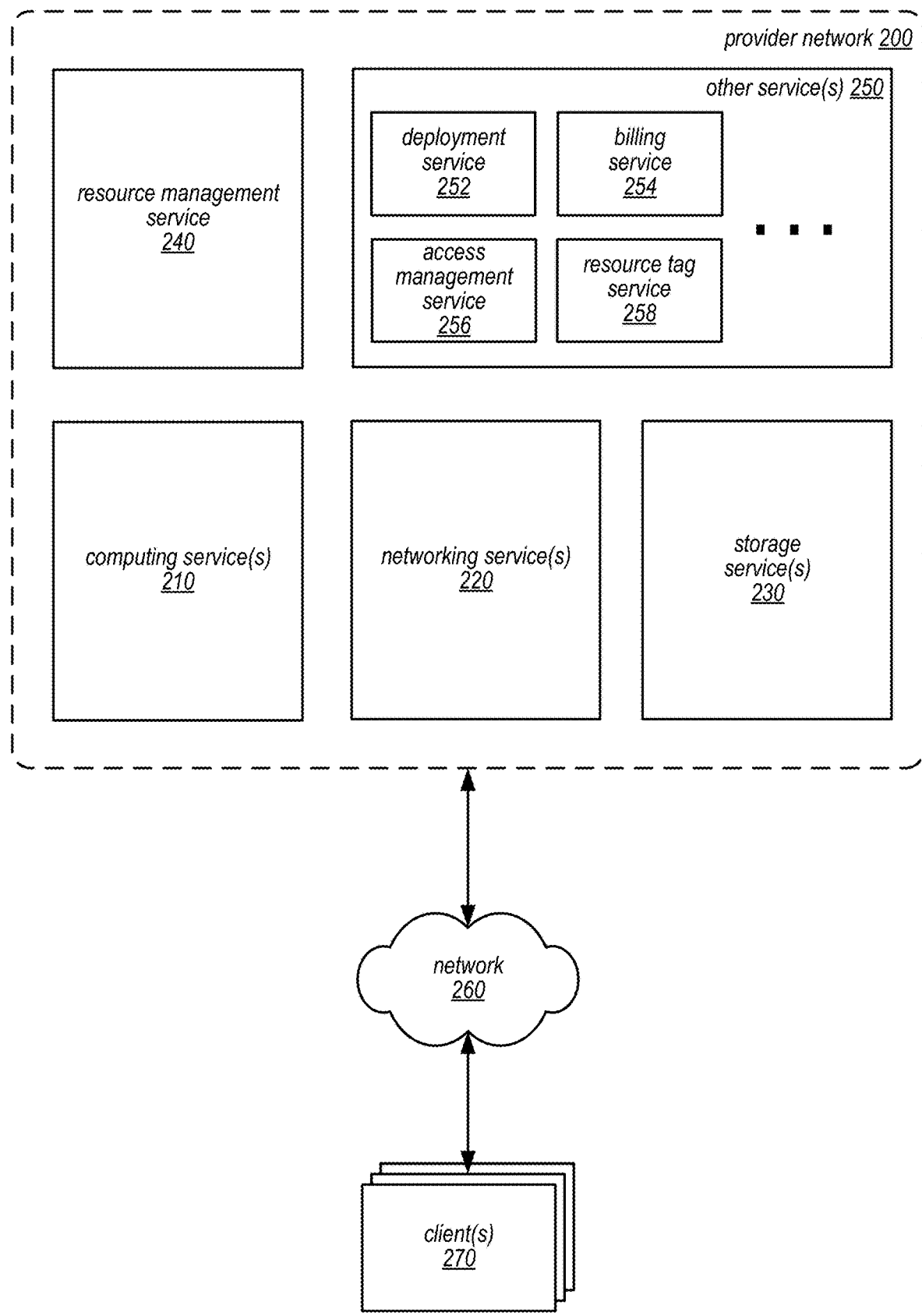
FIG. 2 is a logical block diagram illustrating a provider network that implements a resource management service that provides different hierarchies of resource data objects for managing provider network resources and implements atomic application of multiple updates to the different hierarchies, according to some embodiments.

FIG. 2 is a logical block diagram illustrating a provider network that implements a resource management service that provides different hierarchies of resource data objects for managing provider network resources and implements atomic application of multiple updates to the different hierarchies, according to some embodiments. Provider network 200 may be set up by an entity such as a company or a public sector organization to provide one or more services (such as various types of cloud-based computing or storage) accessible via the Internet and/or other networks to clients 270. Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200. In some embodiments, provider network 200 may implement computing service(s) 210, networking service(s) 220, storage service(s) 230, resource management service 240 (which is discussed in detail below with regard to FIGS. 3-7), and/or any other type of network based services 250 (which may include various other types of storage, processing, analysis, communication, event handling, visualization, and security services as well as services for operating the services offered by provider network 200, including deployment service 252, billing service 254, access management service 256, and resource tag service 258). Clients 270 may access these various services offered by provider network 200 via network 260. Likewise network-based services may themselves communicate and/or make use of one another to provide different services. For example, various ones of computing service(s) 210, networking service(s) 220, storage service(s) 230, and/or other service(s) 250 may lookup policies applied to resource data objects in different hierarchies maintained as part of resource management service 240 describing resources in the services in order to enforce behaviors, actions, configurations, or controls indicated in the policies.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given service system component (e.g., a component of the resource management service or a component of the computing service) may be implemented by a particular node or may be distributed across several nodes. In some embodiments, a given node may implement the functionality of more than one service system component (e.g., more than one storage service system component).

Computing service(s) 210 may provide computing resources to client(s) 270 of provider network 200. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 270 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 270 applications, without for example requiring the client 270 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Networking service(s) 220 may implement various networking resources to configure or provide virtual networks, such as virtual private networks (VPNs), among other resources implemented in provider network 200 (e.g., instances of computing service(s) 210 or data stored as part of storage service(s) 230) as well as control access with external systems or devices. For example, networking service(s) 220 may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured.

Networking service(s) 220 may manage or configure the internal network for provider network 200 (and thus may be configured for implementing various resources for a client 270). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 270 may be attached to the overlay network so that when a client 270 provides an IP address that they want to send packets to, the IP address is run in virtual space by communicating with a mapping service (or other component or service not illustrated) that knows where the IP overlay addresses are.

Storage service(s) 230 may be one or more different types of services that implement various storage resources to provide different types of storage. For example, storage service(s) 230 may be an object or key-value data store that provides highly durable storage for large amounts of data organized as data objects. In some embodiments, storage service(s) 230 may include an archive long-term storage solution that is highly-durable, yet not easily accessible, in order to provide low-cost storage. In some embodiments, storage service(s) 230 may provide virtual block storage for other computing devices, such as compute instances implemented as part of virtual computing service 210. For example, a virtual block-based storage service may provide block level storage for storing one or more data volumes mapped to particular clients, providing virtual block-based storage (e.g., hard disk storage or other persistent storage) as a contiguous set of logical blocks. Storage service(s) 230 may replicate stored data across multiple different locations, fault tolerant or availability zones, or nodes in order to provide redundancy for durability and availability for access.

In some embodiments, storage service(s) 230 may include resources implementing many different types of databases and/or database schemas. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

In some embodiments, storage service(s) 230 may implement a hierarchical data storage service, such as hierarchical data store 350 in FIG. 3 discussed below. A hierarchical data storage service may store, manage, and maintain hierarchical data structures, such as a directory structure discussed below with regard to FIGS. 5A and 5B. Clients of a hierarchical data storage service may operate on any subset or portion of a hierarchical data structure maintained in the data storage service with transactional semantics and/or may perform path-based traversals of hierarchical data structures. Such features allow clients to access hierarchical data structures in many ways. For instance, clients may utilize bulk edit requests to perform multiple operations concurrently, affecting different portions (e.g., nodes) of the hierarchical data structure (e.g., reading parts of the hierarchical data structure, adding a node, and indexing some of the node's attributes, while imposing the requirement that the resulting updates of the operations within the transaction are isolated, consistent, atomic and durably stored). As discussed below, in at least some embodiments, the hierarchical data stored in a hierarchical data storage service may be hierarchies of resource data objects on behalf of resource management service 240.

In various embodiments, provider network 200 may implement various other service(s) 250, including deployment service 252. Deployment service 252 may include resources to instantiate, deploy, and scale other resources (from other network-based service, such as computing service(s) 210, networking service(s) 220, and/or storage service(s) 230) to implement a variety of different services, applications, or systems. For example, deployment service 252 may execute pre-defined deployment schemes which may be configured based, at least in part, on policies applied to resources launched by the deployment service 252 (e.g., a policy that describes the hardware and software configuration of virtual compute instance launched on behalf of particular user account).

Provider network 200 may also implement billing service 254 which may implement components to coordinate the metering and accounting of client usage of network-based services, such as by tracking the identities of requesting clients, the number and/or frequency of client requests, the size of data stored or retrieved on behalf of clients, overall resource bandwidth used by clients, class/type/number of resources requested by clients, or any other measurable client usage parameter. Billing service 254 may maintain a database of usage data that may be queried and processed by external systems for reporting and billing of client usage activity. Similar to deployment service 252, policies applied to resource data objects in hierarchies managed by resource management service 240 may indicate payment accounts, budgets, or responsible parties for which the usage data is to be reported and/or billed.

Provider network may also implement access management service 256, which may implement user authentication and access control procedures defined for different resources (e.g., instances, user accounts, data volumes, etc.) as described by policies applied to resource data objects in hierarchies at resource management service 240. For example, for a given network-based services request to access a particular compute instance, provider network 200 may implement components configured to ascertain whether the client associated with the access is authorized to configured or perform the requested task. Authorization may be determined such by, for example, evaluating an identity, password or other credential against credentials associated with the resources, or evaluating the requested access to the provider network 200 resource against an access control list for the particular resource. For example, if a client does not have sufficient credentials to access the resource, the request may be rejected, for example by returning a response to the requesting client indicating an error condition.

Provider network 200 may also implement resource tag service 258, which may manage resource attributes for resources of other services (e.g., computing service(s) 210, networking service(s) 220, and/or storage service(s) 230). Resource attributes may be a tag, label, set of metadata, or any other descriptor or information corresponding to a provider network resource, implemented at one of various network-based services of the provider network. Attributes may be represented in various ways, such as a key-value pair, multiple values, or any other arrangement of information descriptive of the resource. Resource attributes for a resource may be maintained as part of resource metadata for the resources at network-based services. Network-based services may create resource metadata and/or attributes when a resource is created by a client. However, a client may wish to modify, remove, and/or add new resources attributes to the resource metadata in order to provide greater flexibility for automating various interactions within the resources utilizing resource metadata. Resource tag service 258 may lookup policies for different resources to determine which resource attributes are to be maintained for the different resources, in some embodiments.

Generally speaking, clients 270 may encompass any type of client configurable to submit network-based services requests to provider network 200 via network 260, including requests for directory services (e.g., a request to create or modify a hierarchical data structure to be stored in directory storage service 220, etc.). For example, a given client 270 may include a suitable version of a web browser, or may include a plug-in module or other type of code module configured to execute as an extension to or within an execution environment provided by a web browser. Alternatively, a client 270 may encompass an application such as a database application (or user interface thereof), a media application, an office application or any other application that may make use of persistent storage resources to store and/or access one or more hierarchical data structures to perform techniques like organization management, identity management, or rights/authorization management. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with network-based services platform 200. In some embodiments, client 270 may be configured to generate network-based services requests according to a Representational State Transfer (REST)-style network-based services architecture, a document- or message-based network-based services architecture, or another suitable network-based services architecture.

In some embodiments, a client 270 may be configured to provide access to network-based services to other applications in a manner that is transparent to those applications. For example, client 270 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 270 and the operating system or file system on behalf of applications executing within the operating system environment.

Clients 270 may convey network-based services requests (e.g., access requests directed to hierarchies in resource management service 240) to and receive responses from network-based services platform 200 via network 260. In various embodiments, network 260 may encompass any suitable combination of networking hardware and protocols necessary to establish network-based-based communications between clients 270 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and network-based services platform 200. It is noted that in some embodiments, clients 270 may communicate with network-based services platform 200 using a private network rather than the public Internet.

Figure 3:
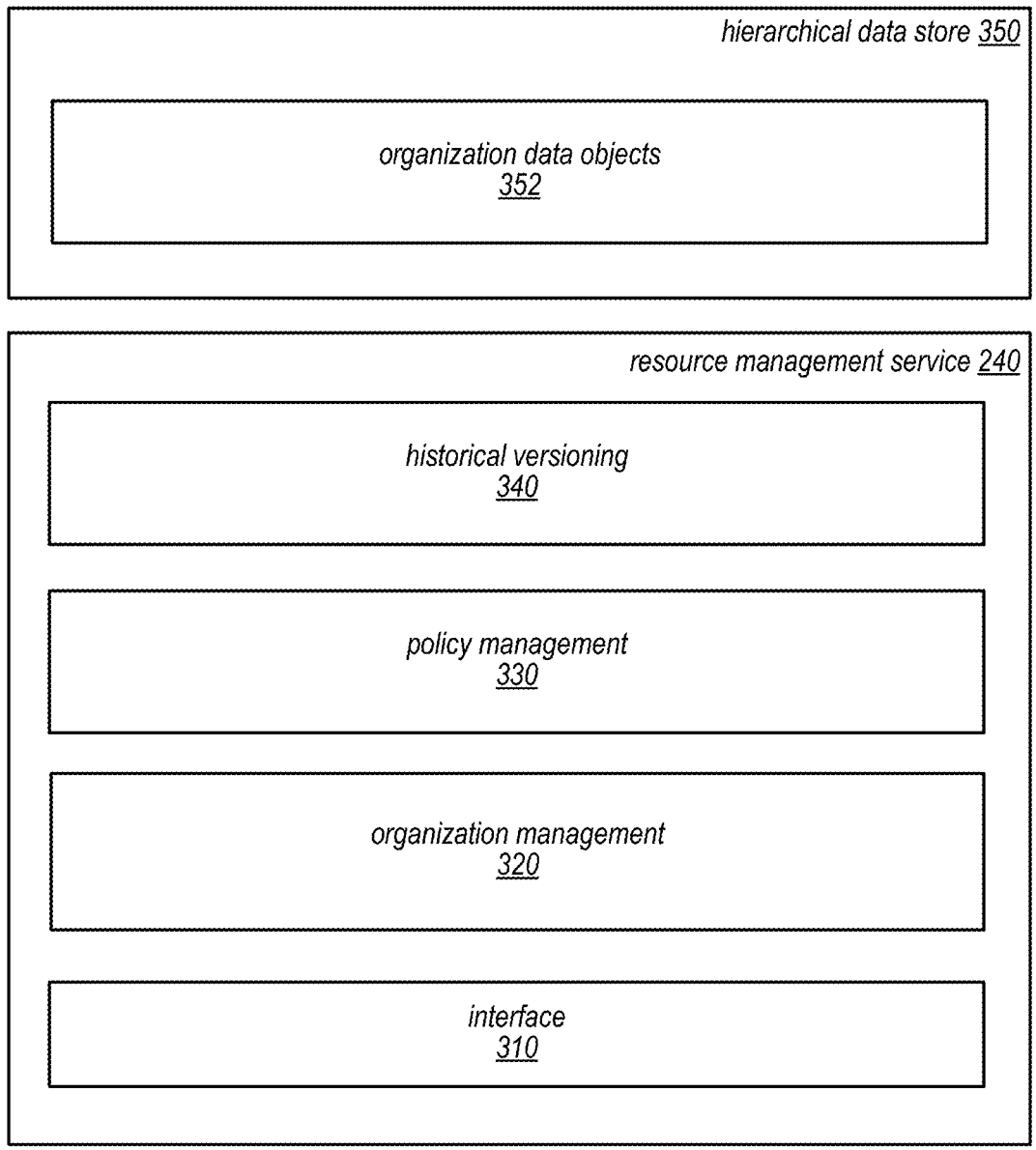
FIG. 3 is a logical block diagram illustrating a resource management service and a hierarchical data store, according to some embodiments.

FIG. 3 is a logical block diagram illustrating a resource management service and a hierarchical data store, according to some embodiments. Resource management service 240 may manage the application of policies to resource data objects for resources in provider network 200. As provider network 200 may offer services to a variety of different customers, a collection or set of resource data objects that are managed together may identified as an organization (although various other terms including entity, domain, or any other identifier for the collection of resource data objects may also be used). Resource management service 240 may provide various capabilities to clients of resource management service 240 to create and manage respective organizations which includes the resource data objects describing the resources of provider network 200 which are associated with one or more customers of the provider network, including managing which resource data objects (and thus their corresponding resources) are members of an organization). Resource management service 240 may allow for the creation and management of multiple different hierarchies of the resources in an organization. These resources may be further subdivided and assigned into groups (which also may be subdomains, directories, sub-entities, sets, etc.). Groups may consist of any resource that can have a policy applied to it. Resource management service 240 may allow clients to author policies and apply them to the organization, to different groups, or directly to resource data objects.

Resource management service 240 may implement interface 310, which may provide a programmatic and/or graphical user interface for clients to request the performance of various operations for managing system resources via an organization. For example, various requests to add a group, remove a group, add resources to a group, remove resource(s) from a group, add a group to a group, remove a group from a group, or any other arrangement modification to the hierarchy, requests to add policies or remove policies from resources or groups or any other modification to the resource data objects, groups or other nodes in the hierarchy may be formatted according to an Application Programming Interface (API) and submitted via a command line interface or a network-based site interface (e.g., website interface). Other requests that may be submitted via interface 310 may be requests to create an organization, update an organization (e.g., by adding other resources, inviting other user accounts to join the organization. In some embodiments, an organization may be treated as a resource owned or controlled by the user account that created it, and that account by default may have access permissions to the organization. The user account could then delegate permissions to other user accounts or users using cross-account access or transfer ownership of the organization, in cases where control needs to move to a delegated group or the owner needs to leave the organization.

Resource management service 240 may implement organization management 320, which may handle the creation of organizations, the updates to or modifications of organizations, the delegation of access permissions to organizations, as well as the arrangement of resource data objects within hierarchies maintained for the organization. For example, upon creation an organization may include a single hierarchy providing an arrangement of resource data objects (e.g., as members of various groups and/or groups within groups, etc.). Resource management 320 may handle the various requests to create additional hierarchies, update hierarchies, or delete hierarchies. Organization management 320 may also handle requests to add resource data objects to an organization (e.g., as part of a bulk edit or an individual request). For example, organization management may identify which hierarchies a new resource data object should be added to and the location within the hierarchy that the resource data object should be added. In at least some embodiments, organization management may coordinate organization changes between multiple parties, such as adding user accounts to or removing user accounts from an organization and may implement multiparty agreement mechanisms to approve the change to the organization. For example, organization management 320 may facilitate an authenticated 2-way handshake mechanism to confirm or deny a potential change to an organization. Organization manager 240 may expose different mechanisms for multiparty agreements, including emailed invitations, single use tokens, and shared secrets (domains/passwords). When agreement is confirmed, organization management 320 may then perform the agreed upon changes to the organization.

As noted above, policies may be authored or defined and then applied to various resource data objects, groups, or an entire hierarchy of an organization. Resource management service 240 may implement policy management 330 to handle the authoring of policies as well the application of policies. Many different types of policies may be applied in order to define different types of behaviors. Some policy types, for instance, may be related to specific behaviors, resources, or actors. Billing related policies, for instance, may have one or various types of billing policies. Resource configuration policy types (e.g., configuring operational configuration of resources, when deployed by deployment service 252 for instance. Some policy types can define access controls to resources. Policy management 330 may handle various requests to create instance of policy types, define policy types by authoring a policy schema, and the application of policies to resource data objects, groups, or entire hierarchies within an organization.

Policy management 330 may also handle lookup requests for resource data objects, groups, or organizations and perform policy application and conflict resolutions, as discussed below with regard to FIG. 4. For example, policies can also be inherited in a chain from the organization down to a group, group of groups, or individual resource data object. If a policy is applied to a parent node in the hierarchy, then the child node (group, group of groups, or individual resource data object) may inherit the policy of the parent node. In this way, the policy applied to the parent node becomes the "default" policy, in the absence of any other policy applications. When there are multiple policies in the inheritance path, for example there is a policy applied at both the hierarchy and group level, then different policies may have different inheritance semantics, which may have to be resolved. In one scenario, access policies may follow the semantics of a set union, where ordering does not matter (e.g., everything is allowed unless explicitly excluded). Billing policies, in another scenario, may implement a "child wins/parent appends" inheritance model where a child policy may be executed, followed by a parent policy. In such scenarios, ordering of policies matters. Thus, policy application 330 may be configured to resolve conflicting policies according to the appropriate inheritance semantics for the policy.

In at least some embodiments, policy management 330 may implement policy validation (although in alternative embodiments validation may be delegated in part or in total to other components). Validation of policies may include syntax validation. Syntax validation checks policies instances of policy types that are authored to determine whether the policy instance is syntactically correct so that the policy can be parsed and evaluated by backend systems that lookup the policy. Syntactic validation may be performed, in some embodiments, when authored. In addition to syntactic validation, some policies may undergo semantic validation. Semantic validation may be performed to ensure that a resource or other information specified in a policy results in a policy that can be enforced. For example, semantic validation could determine whether an AccountId specified in a payer policy is an account in the organization that has a valid payment instrument. In addition to semantically validating the policies themselves, policy management 330 may validate policy applications and organization changes, in order to ensure that the changes do not invalidate policies that are applied within the organization. For example, validation of changes to ensure that a payer for an organization doesn't leave the organization. As each policy may have different semantic validation logic, each policy may have a separately configurable semantic validator.

Resource management service 240 may implement historical versioning of hierarchies in organizations, in some embodiments. Some services, such as billing service 254, may require the ability to query for historically versioned data, such as which account was the payer of the organization at the end of the previous month (as the current payer may be different due to a change to a hierarchy). In order to provide historical versions of hierarchies (including the policies applied and resource data objects arranged), historical versioning 340 may store prior versions or track or record changes to hierarchies. These prior versions or changes may be associated with particular points in time (e.g., by assigning timestamps). Historical versioning 340 may handle requests for policy lookups across particular ranges of time or at particular points in time. Historical versioning 340 may access the versioned data and return the appropriate policies for the specified time(s). Hierarchy versions may be stored as part of organization data objects 352 in hierarchical data store 350, in some embodiments.

Hierarchical data store 360 may provide data storage for organization data objects 362, including the resource data objects, policy data objects, and any other data describing the organization, including the multiple hierarchies of the resource data objects, as discussed below with regard to FIG. 5A. The organization data objects 352 may be maintained within a single hierarchical data structure, though different hierarchies of resource data objects within the single hierarchical data structure may be provided for managing resource data objects, as discussed below with regard to FIG. 5A. Hierarchical data store 360 may provide for transactional support in order to perform transactions submitted to hierarchical data store 360. For example, hierarchical data store 360 may provide a fault tolerant, high performance, durable, log publishing service. This transaction log storage 250 may provide strong consistency guarantees and support constraints between committed records, to enable features like deduplication, sequencing, and read-write conflict detection. For example, in the request to commit a bulk edit discussed below with regard to FIG. 6, transaction log storage implemented as part of hierarchical data store 360 may be used to determine whether or not to atomically commit a replacement of the copy of a portion of a hierarchy with a current hierarchy by examining a proposed transaction for conflicts with other committed transactions (e.g., other committed bulk edits for the same portion of a hierarchy). Such a feature may provide a fine-grained locking model over a hierarchical data structure (e.g., only those portions of the hierarchical data structure affected by a conflict between transactions may be locked). Transaction log storage may maintain a separate log or chain of log records for each hierarchical data structure, serving as an authoritative definition of the changes to the state hierarchical data structure over time. Transactions may be ordered according to transaction sequence numbers, which may be monotonically increasing to reference the state of a hierarchical data structure at individual points in time. Note that in some embodiments, transaction log storage may be a separate network-based storage service implemented as part of provider network 200 external to resource management service 240.

Figure 4:
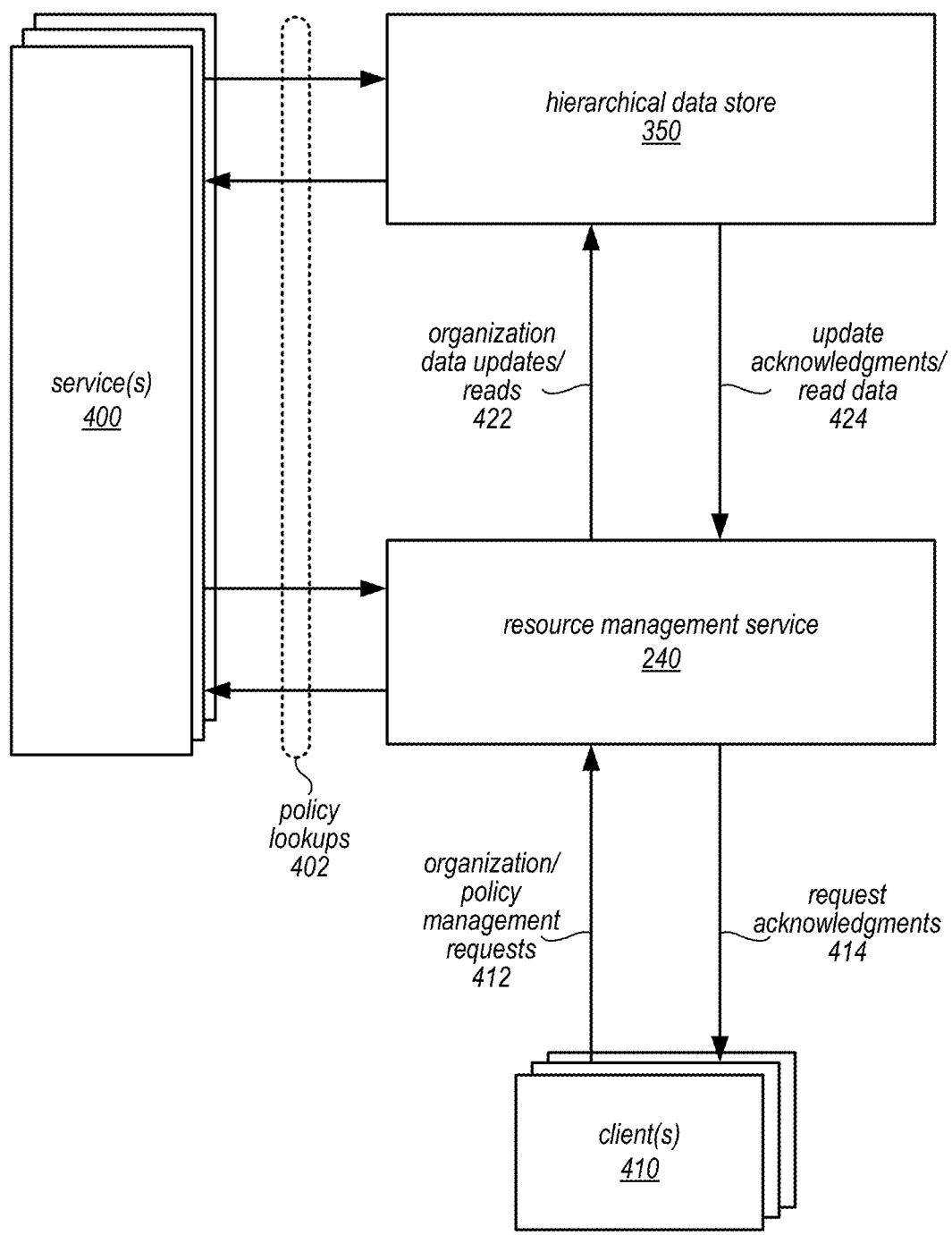
FIG. 4 is a logical block diagram illustrating interactions between clients and a resource management service and between a resource management service and other services, according to some embodiments.

FIG. 4 is a logical block diagram illustrating interactions between clients and a resource management service and between a resource management service and other services, according to some embodiments. As noted above, clients may interact with resource management service 240 to manage resources. For example, client(s) 410 may submit various organization/policy management requests 412 (e.g., to modify a hierarchy by arranging resource data objects or applying/removing policies). In turn resource management service 240, may identify the appropriate updates to organization data to be made or to be read, and send organization data updates/reads 422 to hierarchical data storage 350. Hierarchical data storage 350 may execute the received requests to change hierarchical data structures storing the organization data objects in accordance with the update request or retrieve the appropriate data read from the organization data objects according to the hierarchies, and return update acknowledgements/read data 424 to resource management service 240. In turn, resource management service 240 may return the appropriate acknowledgments (e.g., indicating success or failure of the requests.

Service(s) 400 may perform policy lookups 402 with respect to resource data objects corresponding to resources under the control or responsibility of service(s) 400, in various embodiments. For example, an access control service, such as access management service 256, may lookup the access policies for a particular resource (e.g., compute instance or user account) in order to permit or deny an access request. When launching new resources, network configuration information may be maintained in a policy that is applicable to the launched resource and may be retrieved by a policy lookup 402 from a service 400. Policy lookups 402 may be requested via resource management service 240 or, in some embodiments, may be requested directly from the service to the hierarchical data store 350. Latency sensitive services, for instance, may implement local libraries, agents, or interpreters for the organization data maintained at hierarchical data store 350 in order to reduce the number of requests that have to be sent in order to perform a policy lookup.

Figure 5A:
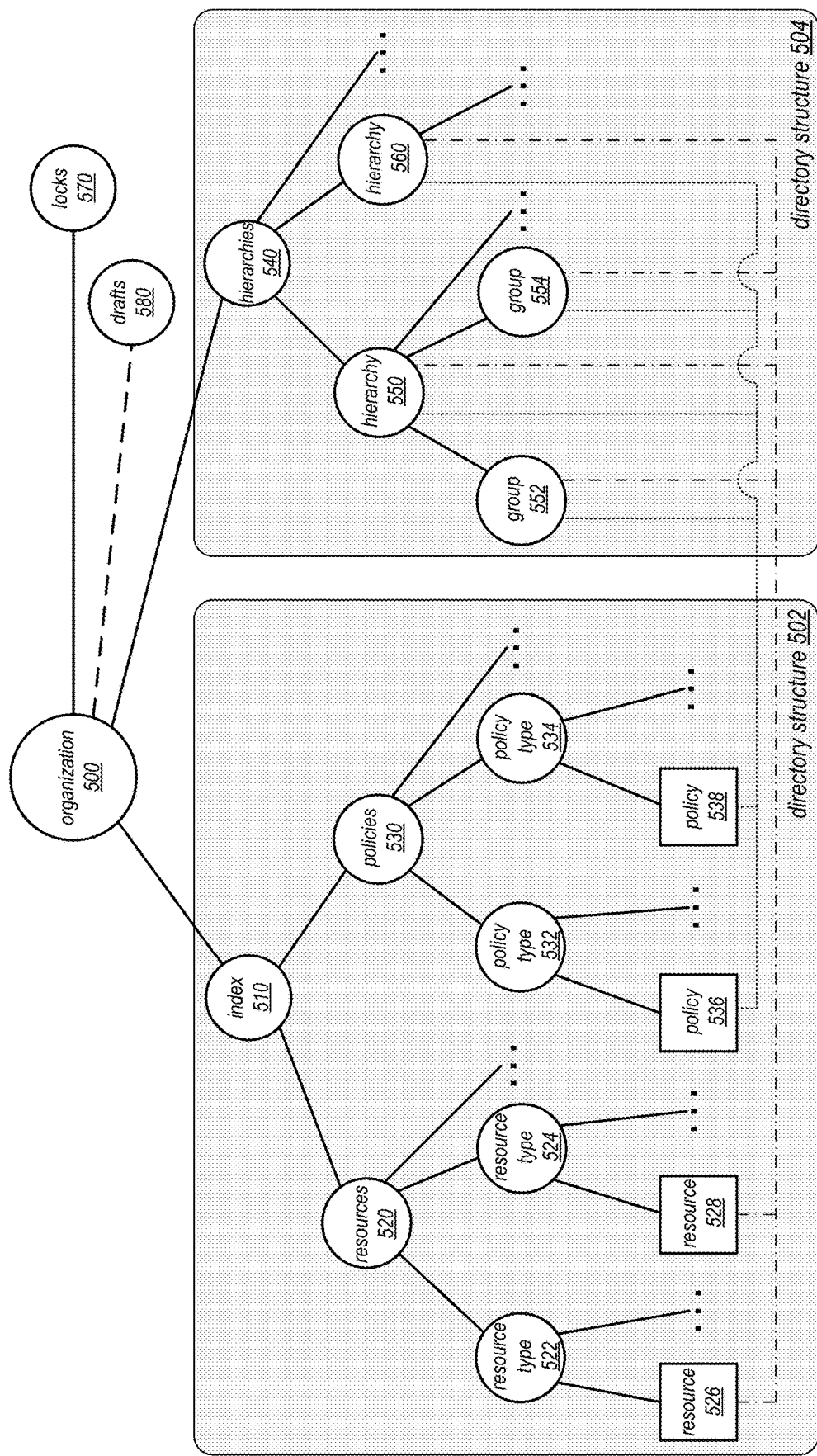
FIGS. 5A and 5B are logical illustrations of directory structures that may store resource data objects, hierarchies of resource data objects, access locks for hierarchies, and draft copies of bulk edits to hierarchies of resource data objects in a hierarchical data store, according to some embodiments.

FIG. 5A is a logical illustration of directory structures that may store resource data objects and hierarchies of resource data objects in a hierarchical data store, according to some embodiments. Organization data objects (including policy data objects, resource data objects, groups or groups of groups of data objects) may be maintained in one or multiple directory structures, in various embodiments. For example, organization 500 may utilize directory structure 502 to store the resources and policies that are part of the organization. Index node 510 may provide information for performing a lookup to determine the location of a resource data object or policy data object. Resources node 520 may group resources into various resources types 522 and 524 (e.g., user accounts, virtual compute instances, storage volumes, VPNs, load balancers, etc.) and within the resource types 522 and 524 may be found resource data objects 526 and 528 describing individual resources in the provider network. Similarly, policies node 530 may include different policy types 532 and 534 (which may be created by clients as discussed above). Individual instances of the policy types 536 and 538 may be policy instances applied to resource data objects, groups, groups of groups, or hierarchies.

Organization 500 may also utilize directory structure 504 to maintain different hierarchies of resource data objects and policy data objects. Hierarchies node 540 may be the group of hierarchies maintained for organization 500, including hierarchy 550 and hierarchy 560. Within each hierarchy, groups, 552 and 554 or groups of groups, and/or any arrangement of resources included in the group of resources 520 may be linked (as illustrated by the dotted lines) to indicate membership in the group. Similar policies, such as policies 536 and 538 may be linked to hierarchies, groups or groups of groups, or individual resource data objects within the hierarchies.

Different types of hierarchical data structures, such as directory structures 502 and 504, may be stored, managed, and or represented in order to maintain organization 500. For example nodes in a hierarchy (e.g., the circle or square shapes) may have a globally unique identifier (GUID), zero or more attributes (key, value pairs), and zero or more links to other nodes. In some embodiments, a group or directory may be one type of node which has zero or more child links to other nodes, either groups/directories or resource data objects/policy data objects. Group nodes may have zero or one parent directory node, implying that directory nodes and links define a tree structure, in some embodiments, as depicted in FIG. 5A. Index 510, hierarchies 540, resources 520, policies 530, hierarchy 550 and 560, resource type 522 and 524, policy type 532 and 534, and group 552 and 554 may be group/directory nodes. Node 500, organization node, may be a root node that is the logical root multiple directory structures and may not be visible to clients of resource management service (which may access individual hierarchies). Resource and policy nodes (represented by squares such as resource node) may be leaf nodes in a directory structure 410. Leaf nodes may have a unique external Id (e.g., client specified) and client-defined attributes. Leaf nodes can have more than one parent node so that resource data objects and policy data objects can be linked to multiple hierarchies. In some embodiments, all resource data objects are linked to all hierarchies (though in different arrangements as defined by a user), whereas in other embodiments, resource data objects may be linked to only some hierarchies.

In some embodiments, a link may be a directed edge between two nodes defining a relationship between the two nodes. There may be many types of links, such as client visible link types and another link type for internal hierarchical data store operation. In some embodiments, a child link type may create a parent—child relationship between the nodes it connects. For example, child link can connect resource type node 522 to resource 526. Child links may define the structure of directories (e.g., resources 520, policies 530, hierarchies 540). Child links may be named in order to define the path of the node that the link points to. Another type of client visible link may be an attachment link. An attachment link may apply a resource data object or policy data object to another node (e.g., group 552, hierarchy 550, etc.) as depicted by the dotted lines. Nodes can have multiple attachments. In some embodiments, some attachment restrictions may be enforced, such as a restriction that not more than one policy node (e.g., policy 536) of policy type 532 can be attached to a same node. A non-visible type of link or implied link type may also be implemented in some embodiments, a reverse link. Reverse links may be used for optimizing traversal of directory structures for common operations like look-ups (e.g., policy lookups).

In various embodiments, data objects or nodes in organization 500 can be identified and found by the pathnames that describe how to reach the node starting from the logical root node 500, starting with the link labeled "/" and following the child links separated by path separator "/" until reaching the desired node. For example, resource 526 can be identified using the path: "/index510/resources520/resource526". As some nodes may be children of multiple directory nodes, multiple paths may identify the node. For example, the following path can also be used to identify resource 526: "/hierarchies540/hierarchy550/group 552".

Figure 5B:
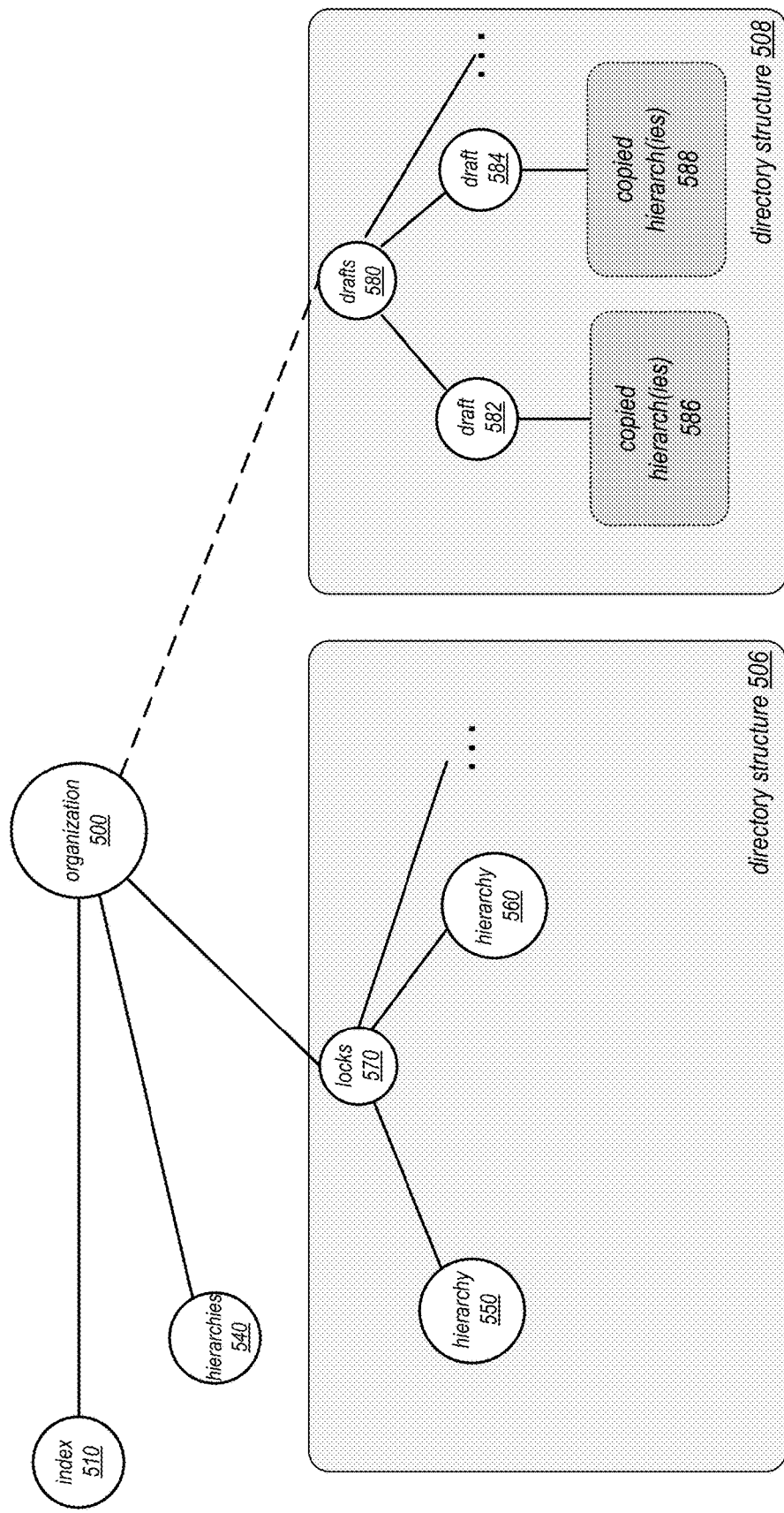

FIG. 5B is a logical illustration of directory structures that store access locks for hierarchies, and draft copies of bulk edits to hierarchies of resource data objects in a hierarchical data store, according to some embodiments. For example, directory structure 506 may maintain locks node 570. Locks node 570 may have child nodes corresponding to each hierarchy in hierarchies 540, such as hierarchy 550 and hierarchy 560. If a hierarchy node is linked to locks 570, then a lookup upon the hierarchy node will be able to traverse the locks 570 structure, indicating that the hierarchy is available for read and write access. If, however, a node is not found when traversing locks 570, then it may be determined that the hierarchy is not available for write access.

Drafts node 570 may also logically point to or associate a directory structure 508 that separately maintains different drafts for bulk edit requests. For instance, although the draft directory structure 508 is logically linked with organization 500, a path-based traversal technique that identifies data by traversing from leaf nodes to the path would not view the logical link as part of a path, so that any path-based traversal would logically separate the drafts from other data stored in organization 500. Each draft node, such as draft 582 and draft 584 may link to a copied hierarchy (e.g., 586 and 588) upon which modifications are performed as part of a bulk edit. When the bulk edit is committed, the link from copied hierarchy 586 is changed from draft 582 to the hierarchies node 540 and links removed from the original hierarchy (e.g., hierarchy 550 or 560) to hierarchies node 540 In this way, a new version of the hierarchy can be easily inserted into hierarchies node 540 without performing operations copy or relink each child node in the hierarchy. The old versions of hierarchies may remained unlinked until storage space for the old versions is reclaimed (e.g., as part of a background garbage collection process).

Please note that the illustrations in FIGS. 5A and 5B provide many examples of the possible ways in which policy data objects or lease data objects may be linked, as well as providing separate storage for drafts of bulk edits to portions or entire hierarchies and locks indicating which hierarchies are available for write access. As noted earlier, not all policies may be attached to all hierarchies or all resource data objects to all hierarchies and thus the illustrated links are not intended to be limiting. Similar, directory structures may be differently arrange so that a single directory structure or greater number of directory structures are utilized. Moreover, draft copies of hierarchies may be maintained separately from an entire organization and in a different format than the original hierarchy that is being modified, unlike the illustration in FIG. 5B. Locks may be separately stored as part of a table or other data format or structure that is not hierarchical, in some embodiments.

Figure 6:
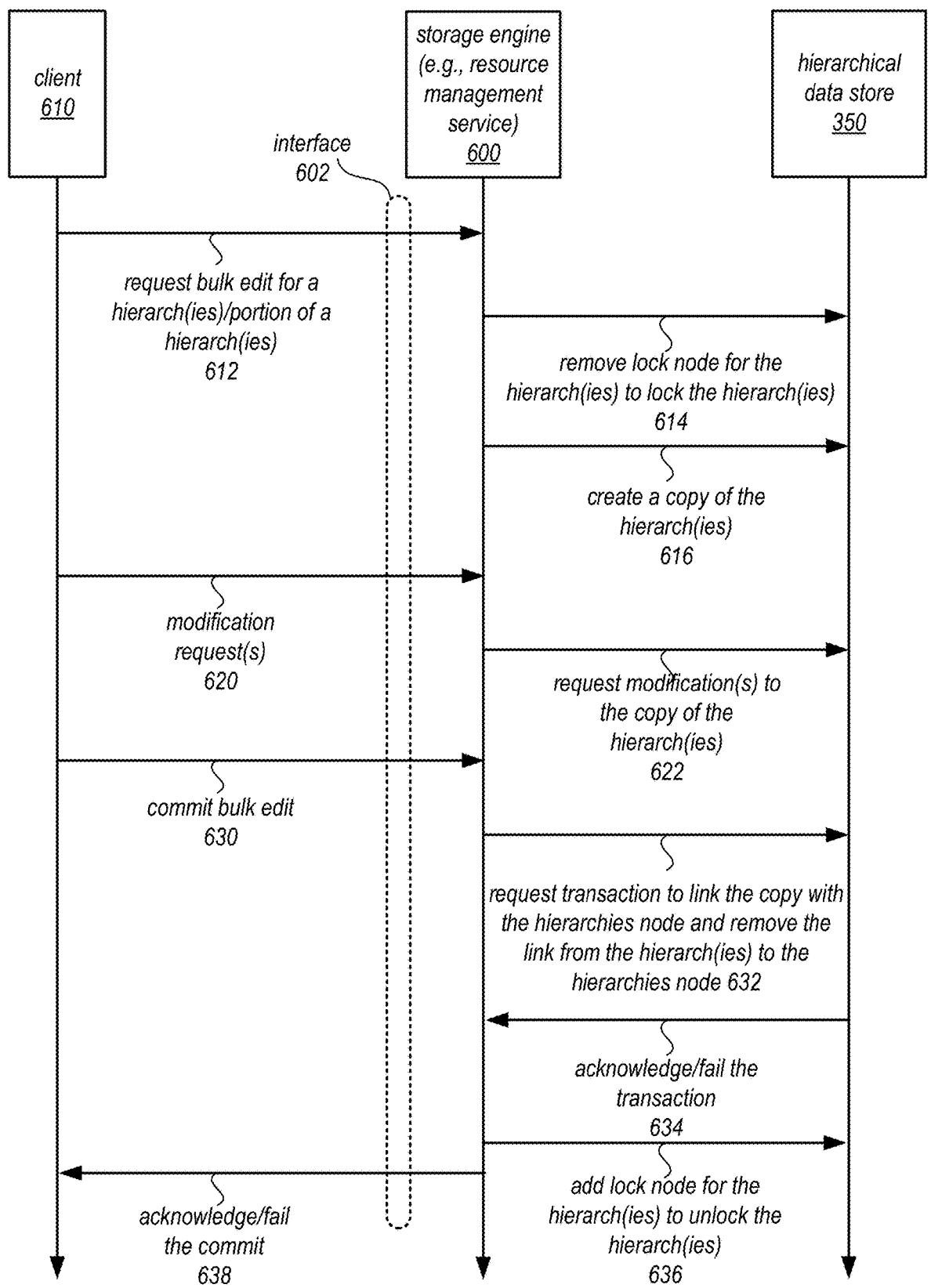
FIG. 6 illustrates interactions to perform a bulk edit at a storage engine that atomically applies multiple changes to a hierarchical data structure, according to some embodiments.

FIG. 6 illustrates interactions to perform a bulk edit at a storage engine that atomically applies multiple changes to a hierarchical data structure, according to some embodiments. Client 610 may be a client of resource management service 240 or any other client that utilizes a storage engine to atomically apply multiple updates to a hierarchical data structure. Client 610 may submit a request via interface 602 to request a bulk edit for hierarch(ies) or portion of hierarch(ies) 612. A bulk edit request may be a request to atomically apply a set of modifications to a hierarchical data structure as discussed above with regard to FIG. 1 and below with regard to FIG. 7. In response to receiving the request storage engine 600 may send a request to remove a lock node for the hierarch(ies) 614 in order to lock the hierarch(ies), blocking write requests to the hierarch(ies). Storage engine 600 may also send a request 616 or multiple requests to create a copy of the hierarch(ies) 616 at hierarchical data store 350 that is separate from the hierarch(ies).

Client 610 may then submit various modification request(s) 620 over a period of time (which may or may not be subject to a time limit). Modification request(s) 620 may correspond to various requests to update the hierarch(ies) as discussed above (e.g., various requests to add a group, remove a group, add resources to a group, remove resource(s) from a group, add a group to a group, remove a group from a group, or any other arrangement modification to the hierarch(ies), requests to add policies or remove policies from resources or groups or any other modification to the resource data objects, groups or other nodes in the hierarch(ies)). Modification requests 620 may correspond to API requests or over modifications permitted by interface 602 (which may be like interface 310 in FIG. 3). In response to modification requests 620, storage engine 600 may send corresponding requests 622 to perform operations(s) applying the modifications to the copy of the hierarch(ies).

Client 610 may send a request 630 to commit the bulk edit via interface 602. In response to the request storage engine 600 may perform various conflict checks (in some embodiments as discussed below with regard to FIG. 7). Storage engine 600 may submit a transaction that links the copy of the hierarch(ies) with the hierarchies node and removes the link from the hierarch(ies) to the hierarchies node. Acknowledgment or failure of the transaction may be provided 634 and in turn storage engine 600 may indicate acknowledgment or failure of the commit 638 to client 610. Storage engine 600 may also add a lock node back to the hierarch(ies) to unlock the hierarch(ies) 636 in order to allow write access to the hierarch(ies).

Please note that the techniques described above with respect to storage engine 600 may be applicable to a storage engine managing any hierarchical data structure and may not be limited to a hierarchy of resource data objects. Not all interactions have been illustrated. For example, various acknowledgment indications may be provided for different requests that have not been depicted in FIG. 6.

Figure 7:
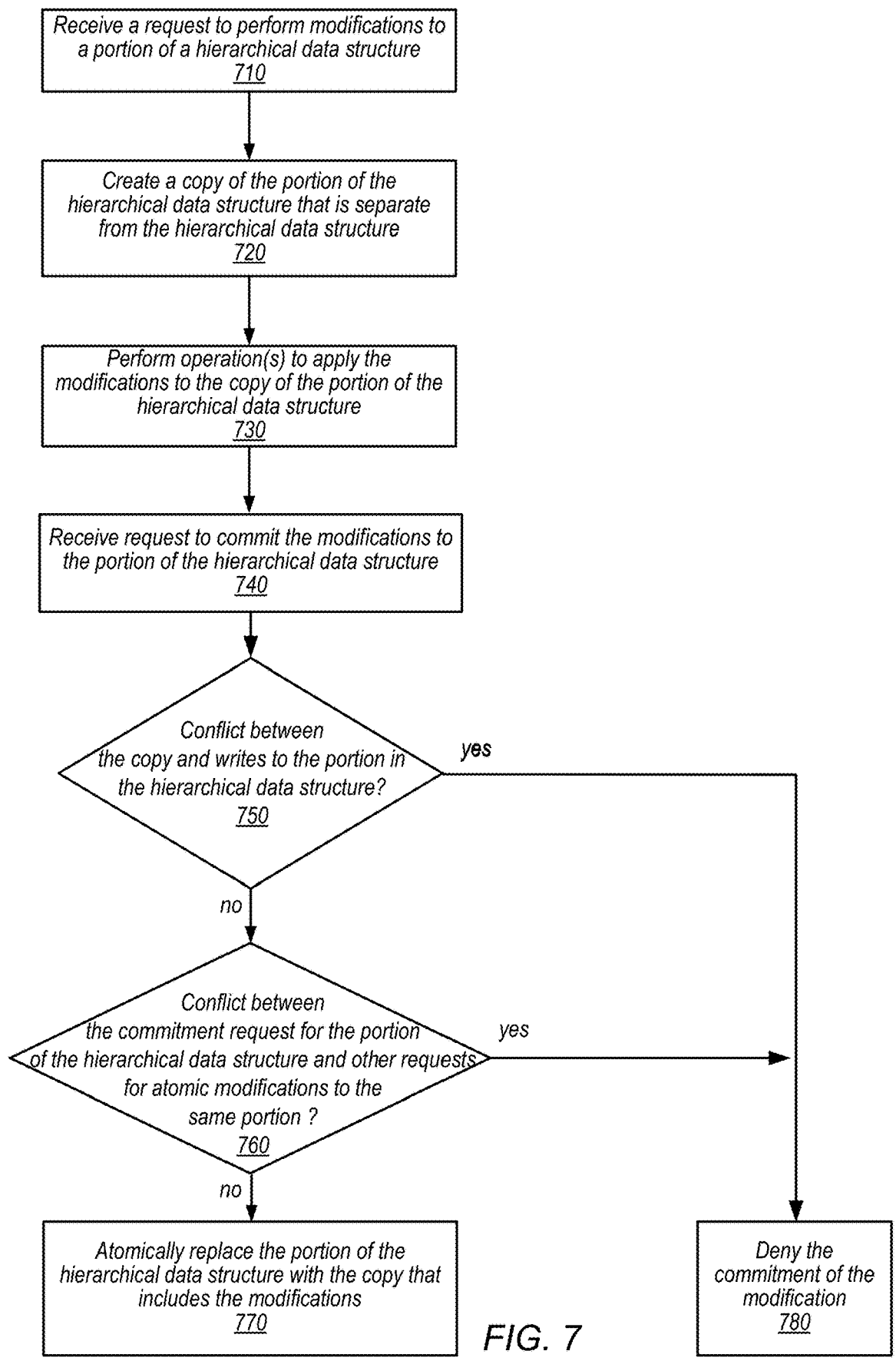
FIG. 7 is a high-level flowchart illustrating methods and techniques to perform atomic application of multiple updates to a hierarchical data structure, according to some embodiments.

Although FIGS. 2-6 have been described and illustrated in the context of a provider network implementing hierarchical data structures as part of a resource management service for managing resources of multiple different services in the provider network, the various components illustrated and described in FIGS. 2-6 may be easily applied to other storage engines or data managers that manage hierarchical data structures. For example, a file directory system accessible to multiple users may allow for atomic application of multiple updates to a portion of a hierarchical data structure that represents a file directory structure. As such, FIGS. 2-6 are not intended to be limiting as to other embodiments of a system that may implement atomic application of multiple updates to a hierarchical data structure. FIG. 7 is a high-level flowchart illustrating methods and techniques to perform atomic application of multiple updates to a hierarchical data structure, according to some embodiments. Various different systems and devices may implement the various methods and techniques described below, either singly or working together. For example, a resource management service such as described above with regard to FIGS. 2-6 may be configured to implement the various methods with respect to hierarchical data structures like different hierarchies. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 710, a request may be received to perform modifications to a portion (or entirety) of a hierarchical data structure. A hierarchical data structure, as noted above, may be a tree, graph, or other hierarchy-based data structure maintained in data storage, such as a hierarchical data store which stores data natively in a hierarchical data format. Hierarchical data structures may be implemented for a variety of different systems and techniques. For example, hierarchical data structures may be implemented to provide a directory structure for file or other data management systems, a classification structure or other representation of data that is interpreted based on the hierarchical relationships within the hierarchical data structure. In one such example, such as discussed above with regard to FIGS. 2-6, different hierarchies of resource data objects stored in a data store may be maintained. The resource data objects may identify policies applicable to the behavior of resources corresponding to the resource data objects in a system. For example, resource data objects may be maintained to describe system resources (e.g., unique identifier, capabilities, roles, availability, etc.). The resource data objects may be separately arranged in different hierarchies so that policies applied to the resource data objects according to the hierarchies (e.g., by inheritance rules or direct application) may enforce the controls, actions, configurations, operations, or other definitions of the behavior of the corresponding resources. The hierarchies may be maintained in a hierarchical data storage system, as described above with regard to FIG. 3. However, other types of data stores may be implemented to maintain the hierarchies (e.g., by maintaining the data objects, and relationships between the data objects that define the hierarchy so that the hierarchy can be determined).

The request may specify the portion of the hierarchical data structure by including an identifier (e.g., node name, path, or identification number) in the request. For example, the request may specify a particular node by a node identification number indicating that the node and all children of the node in the hierarchical data structure are included in the portion for which modifications are to be performed. In some embodiments multiple paths, nodes, or sub-directories of a hierarchical data structure may be identified as part of one portion for performing updates even though the multiple paths, nodes, or sub-directories of the hierarchical data structure may be unconnected except via a root node for the hierarchical data structure. The request to perform modifications may be a request that merely initiates the start of allowing atomic application of multiple updates, as discussed with regard to other elements below. However, in some embodiments the request may also describe, indicate, or propose the various changes to be atomically applied to the specified portion of the hierarchical data structure. Individual modification requests (e.g., formatted according to an API for the performance of different modifications) may be included as part of a request payload, for instance. The request may be received via a programmatic interface such as API, and may be initiated by a command line interface or graphical user interface.

In response to receiving the request to perform the modifications to the portion of the hierarchical data structure, a copy of the portion of the hierarchical data structure may be created that is separate from the hierarchical data structure, as indicated at 720. For example, the nodes in the hierarchical data structure along with the relationships defined between the nodes may be read from the hierarchical data structure in the data store and written to a different location in the hierarchical data structure that does not link the copy to the hierarchical data structure from which it was obtained. In this way, any lookup or analysis performed upon the hierarchical data structure does not discover, read, or obtain any information from the copy of the portion of the data structure, allowing for modifications to be performed on the copy without being accessible. A pointer, address, or other location of the copy of the portion of the hierarchical data structure may be maintained in order to direct operations to modify the portion of the hierarchical data structure to the copy.

In various embodiments, the original portion of the hierarchical data structure (in the hierarchical data structure) may remain available for read access. For example, other clients may wish to access the hierarchical data structure to perform lookup operations (e.g., policy lookups as described above with regard to FIG. 4). Providing read access to the portion of the hierarchical data structure may allow for utilization of the hierarchical data structure to continue during the application of multiple modifications as the modifications are separately performed upon the copy.

In at least some embodiments, write operations may be restricted or blocked entirely. For example a locking mechanism, as discussed above with regard to FIG. 5B may be implemented to identify a portion of a hierarchical data structure undergoing modification so that intervening or conflicting updates may not be performed. In some other embodiments, write access may also be allowed for the original portion of the hierarchical data structure. The write requests may be performed and then later merged as part of a conflict resolution scheme, as discussed below with regard to element 750. In some embodiments, write requests received while modifications to the copy are ongoing (but have not yet been committed) may be replicated to the copy of the portion of the hierarchical data structure. For example, the writes may make changes to the copy which may be reflected in a graphical display of the copy by refreshing the display periodically to include the changes. In some embodiments, the writes may be replicated after receiving a request to commit, but before the modifications made as part of the modifications request are committed. Conflict resolution between replicated writes and the hierarchy may be made as the replicated writes are received in some embodiments. For example, a user could approve or deny displayed conflicts from replicated writes as they are displayed via the GUI or may receive a conflict report upon a request to commit and approve or deny writes in response.

As indicated at 730, operation(s) to apply the modifications to the copy of the portion of the hierarchical data structure may be performed. For instance, the modifications may be specified in the request received at element 710. Alternatively, additional, separately received requests that are identified or associated with the request at element 710 (e.g., that identify a bulk edit or other identifier associated the atomic application of modifications) may identify, describe, or instruct the performance of the modifications (e.g., according to various API commands to perform different hierarchical data structure modifications, change the structure, change nodes, add nodes, remove nodes, update data or attributes associated with nodes, etc.). The requests may be received according to the same interface as the request to perform modifications at element 710.

Requests for modifications may continue to be processed and applied to the copy of the hierarchical data structure until a request to commit the modifications to the portion of the hierarchical data structure is received, as indicated 740. The commit request may include a token, identifier, or other mechanism that corresponds to the initial request for modification (e.g., a bulk edit identifier) so that the commit request is matched with the appropriate copy of the portion of the hierarchical data structure (e.g., in the event that multiple requests for modification are being concurrently processed for the portion of the hierarchical data structure). In response to the commit request, the portion of the hierarchical data structure may be atomically replaced with the copy of the portion of the hierarchical data structure that includes the modifications, as indicated at 770. Atomically replacing the original portion with the copy may be processed as a single transaction that is either performs or fails (e.g., due to errors or conflicts). The data store maintaining the copy and the original portion, for instance, may have a transaction mechanism (e.g., a transaction API) that allows for operations to effect the replacement to occur (e.g., submitting a transaction that reads all of the data from the copy and overwrites the data of the original portion). In some embodiments, the transaction may include actions to link the copy of the portion to a parent node of the original portion and remove a link between the original portion and the same parent node, so that the copy of the portion is grafted or inserted into the hierarchical data structure without having to read and re-write the entire copy over the original portion.

In those embodiments where write access to the original portion of the hierarchical data structure is blocked during the performance of modifications to the portion of the hierarchical data structure, then operations to allow write access to the updated hierarchical data structure that includes the copy may be performed as part atomically replacing the portion with the copy. For instance, the portion of the hierarchical data structure may be unlocked for write access.

As noted above, write access may remain for the original portion of the hierarchical data structure, in some embodiments. As a result, conflicts between the copy and the original portion can occur due to subsequent writes to the original portion. Thus, as indicated at 750, a check for conflict between the copy and writes performed at the original portion of the hierarchical data structure may be performed. A conflict may be detected in various ways. For example, when writes to the original portion contradict a modification made to the copy, a conflict may be detected. Consider a scenario where a write that changes the relationship between two nodes in the original portion (e.g., changing a node's parent node to another parent node in the portion) may occur. This change may contradict a modification made to the copy (e.g., that changes the node's parent to a different node than the change made by the write request). In another example scenario, a write to the original portion may change an attribute for a node to have one value (e.g., value1), while a modification changes the same attribute to have a different value (e.g., value2). Note that not all differences may be considered contradictions. For example, a write to the original may add a new node to a group of nodes with a same parent (e.g., add a resource data object to a group). The modifications may add other nodes to the same parent, modify the parent values or remove other nodes from the same parent. These modifications, however, may not be contradicted by adding the new node, so the write may not be considered a conflict. For those writes that do not cause conflicts, the writes may be replicated to the copy of the hierarchy and commitment of the modifications to the copy may proceed. However, if a conflict is detected, then in some embodiments, the commitment request may be denied, as indicated at 780. Alternatively, if a conflict is detected, the write may be rolled back and failed (e.g., by holding acknowledgement and/or performance of the write request until confirming that the write does not conflict with the copy). Various other conflict detection and resolution schemes may be implemented and thus the previous are not intended to be limiting.

In some embodiments, multiple requests to perform atomic sets of modifications on a same portion of the hierarchical data structure may be received. As indicated 760, conflict between the commitment request and the other requests for atomic modifications to the same portion may be detected. For example, multiple requests to perform atomic application of modifications to the same portion of the hierarchical data structure may be allowed to initiate. However, the first one of these sets of modifications that is successfully committed may prevent the remaining sets of modifications for other requests from committing. Consider a scenario where each of these requests may obtain a timestamp or version number for the portion of the hierarchical data structure. When a set of modifications is successfully committed, the version number or timestamp for the portion of the hierarchical data structure may change (e.g., by changing a version number or timestamp at a root node for the portion). If a commit request is received for a set of modifications to the portion, a check may be made prior to committing the modifications to see if the version number is the same as was first obtained. If the version number is not the same, then another set of modifications may have committed first, creating a conflict. As, indicated by the negative exit from 760, if a conflict exists (e.g., another set of modifications for the portion has already committed), then the commitment request may be denied, as indicated at 780.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 8:
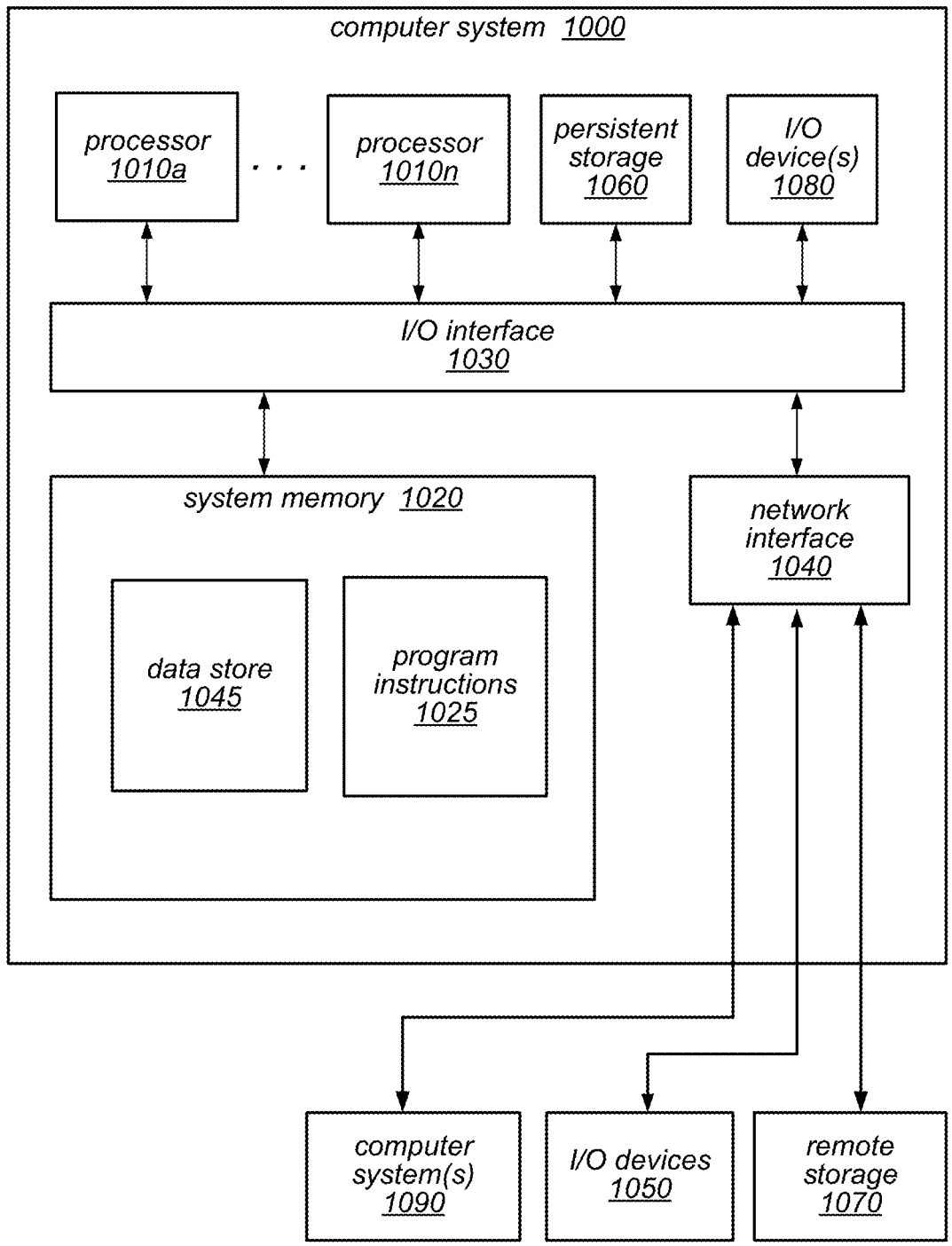
FIG. 8 is an example computer system, according to various embodiments.

FIG. 8 is a block diagram illustrating a computer system configured to implement atomic application of multiple updates to a hierarchical data structure, according to various embodiments, as well as various other systems, components, services or devices described above. For example, computer system 1000 may be configured to implement various components of a resource management service, hierarchical data store, or other provider network services, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the directory storage systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a hierarchy storage nodes that maintain versions of hierarchical data structures or components of a transaction log store that maintain transaction logs for hierarchical data structures, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the hierarchy storage nodes or transaction log store described herein may be stored in data store 1045 or in another portion of system memory 1020 on one or more nodes, in persistent storage 1060, and/or on one or more remote storage devices 1070, at different times and in various embodiments. In general, system memory 1020

(e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement embodiments described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A system, comprising:
 a hierarchical data store that stores a hierarchical data structure;
 at least one processor and a memory storing program instructions that cause the at least one processor to implement a storage engine, configured to:
  receive, via an interface, a request to initiate a bulk edit for at least a portion of the hierarchical data structure;
  create a copy of the portion of the hierarchical data structure in the hierarchical data store that is separate from the hierarchical data structure, wherein the portion of the hierarchical data structure remains available for read access;

receive one or more requests to modify the portion of the hierarchical data structure;

access the hierarchical data store to perform one or more operations corresponding to the modification requests to modify the copy of the portion of the hierarchical data structure;

receive a request to commit the bulk edit for the portion of the hierarchical data structure; and perform a transaction that atomically replaces the portion of the hierarchical data structure with the copy of the portion of the hierarchical data structure that includes the one or more modifications to the hierarchical data structure such that the modified portion of the hierarchical data structure becomes available for read and write access.

2. The system of claim 1, wherein the storage engine is further configured to:

in response to the receipt of the request to initiate the bulk edit for the portion of the hierarchical data structure, block write access to the portion of the hierarchical data structure; and upon performance of the transaction to atomically replace the portion of the hierarchical data structure with the copy of the portion of the hierarchical data structure, allow write access to the copy of the portion in the hierarchical data structure.

3. The system of claim 1, wherein to perform the transaction to atomically replace the portion of the hierarchical data structure with the copy of the portion of the hierarchical data structure, the storage engine is configured to:

remove a link from the portion of the hierarchical data structure from the parent node; and add a link from the copy of the portion of the hierarchical data structure to a parent node for the portion of the hierarchical data structure.

4. The system of claim 1, wherein the storage engine is implemented as part of a resource management service for a provider network, wherein the provider network implements a plurality of different network-based services, wherein the hierarchical data structure comprises resource data objects that identify policies applicable to the behavior of resources corresponding to the resource data objects, and wherein the resources are implemented as part of the different network-based services.

5. A method, comprising:

performing, by one or more computing devices:

receiving a request to perform a plurality of modifications to at least a portion of a hierarchical data structure, wherein the hierarchical data structure comprises resource data objects that identify policies applicable to the behavior of a plurality of resources in a system that correspond to the resource data objects;

creating a copy of the portion of the hierarchical data structure that is separate from the hierarchical data structure, wherein the portion of the hierarchical data structure remains available for read access;

performing one or more operations to apply the modifications to the copy of the portion of the hierarchical data structure;

receiving a request to commit the modifications to the portion of the hierarchical data structure; and atomically replacing the portion of the hierarchical data structure with the copy of the portion of the hierarchical data structure that includes the modification to the hierarchical data structure such that the modified portion of the hierarchical data structure becomes available for read and write access.

6. The method of claim 5, further comprising:

in response to receiving the request to perform the modifications to the portion of the hierarchical data structure, blocking write access to the portion of the hierarchical data structure; and upon atomically replacing the portion of the hierarchical data structure with the copy of the portion of the hierarchical data structure, allowing write access to the copy of the portion in the hierarchical data structure.

7. The method of claim 6, wherein blocking write access to the portion of the hierarchical data structure comprises removing a lock indication for the portion of the data structure from a lock structure in the hierarchical data structure; and wherein allowing write access to the copy of the portion in the hierarchical data structure comprises adding the lock indication for the portion of the data structure back to the lock structure in the hierarchical data structure.

8. The method of claim 5, wherein the portion of the hierarchical data structure remains available for write access, and wherein the method further comprises:

prior to committing the modifications to the portion of the hierarchical data structure, replicating one or more writes received for the portion of the hierarchical data structure to the copy of the hierarchical data structure.

9. The method of claim 5, wherein the request to perform the modifications to the portion of the hierarchical data structure is one of a plurality of received requests to perform respective modifications to the same portion of the hierarchical data structure.

10. The method of claim 9, wherein atomically replacing the portion of the hierarchical data structure with the copy of the portion of the hierarchical data structure is further performed in response to determining that the modifications to commit do not conflict with the plurality of received requests for the same portion of the hierarchical data structure.

11. The method of claim 5, further comprising:

wherein atomically replacing the portion of the hierarchical data structure with the copy of the portion of the hierarchical data structure comprises removing a link from the portion of the hierarchical data structure from the parent node; and subsequent to atomically replacing the portion of the hierarchical data structure with the copy of the portion of the hierarchical data structure, reclaiming storage space in one or more storage devices maintaining the unlinked portion of the hierarchical data structure.

12. The method of claim 5, wherein the request to perform the modifications to the portion of the hierarchical data structure and the request to commit the modifications are received via a programmatic interface, and wherein the method further comprises:

receiving, via the programmatic interface, one or more requests identifying the modifications to perform to the portion of the hierarchical data structure, wherein the one or more operations to apply the modifications to the copy of the portion of the hierarchical data structure are performed in response to receiving the requests identifying the modifications.

13. The method of claim 12, wherein the one or more computing devices implement a system resource manager for the system.

14. A non-transitory, computer-readable storage medium, storing program instructions that when executed by one or more computing devices cause the one or more computing devices to implement:

receiving a request to perform a plurality of modifications to at least a portion of a hierarchical data structure, wherein the hierarchical data structure comprises resource data objects that identify policies applicable to the behavior of a plurality of resources in a system that correspond to the resource data objects;

creating a copy of the portion of the hierarchical data structure that is separate from the hierarchical data structure, wherein the portion of the hierarchical data structure remains available for read access;

receiving one or more requests identifying the modifications to perform to the portion of the hierarchical data structure;

performing one or more operations to apply the modifications to the copy of the portion of the hierarchical data structure;

receiving a request to commit the modifications to the portion of the hierarchical data structure; and atomically replacing the portion of the hierarchical data structure with the copy of the portion of the hierarchical data structure that includes the modification to the hierarchical data structure such that the modified portion of the hierarchical data structure becomes available for read and write access.

15. The non-transitory, computer-readable storage medium of claim 14, wherein the portion of the hierarchical data structure remains available for write access, and wherein the program instructions cause the one or more computing devices to further implement:

prior to committing the modifications to the portion of the hierarchical data structure, replicating one or more writes received for the portion of the hierarchical data structure to the copy of the hierarchical data structure.

16. The non-transitory, computer-readable storage medium of claim 15, wherein the program instructions cause the one or more computing devices to further implement:

prior to committing the modifications to the portion of the hierarchical data structure, determining that the replicated one or more writes do not conflict with the modifications to the portion of the hierarchical data structure.

17. The non-transitory, computer-readable storage medium of claim 14, wherein the program instructions cause the one or more computing devices to further implement:

in response to receiving the request to perform the modifications to the portion of the hierarchical data structure, blocking write access to the portion of the hierarchical data structure; and upon atomically replacing the portion of the hierarchical data structure with the copy of the portion of the hierarchical data structure, allowing write access to the copy of the portion in the hierarchical data structure.

18. The non-transitory, computer-readable storage medium of claim 14, wherein the request to perform the modifications to the portion of the hierarchical data structure, the one or more requests identifying the modifications to perform to the portion of the hierarchical data structure, and the request to commit the modifications are received via a graphical user interface.

19. The non-transitory, computer-readable storage medium of claim 14, wherein, in atomically replacing the portion of the hierarchical data structure with the copy of the portion of the hierarchical data structure, the program instructions cause the one or more computing devices to implement:

removing a link from the portion of the hierarchical data structure from the parent node; and adding a link from the copy of the portion of the hierarchical data structure to a parent node for the portion of the hierarchical data structure.

20. The non-transitory, computer-readable storage medium of claim 14, wherein the one or more computing devices implement a resource management service for a provider network, wherein the provider network implements a plurality of different network-based services, and wherein the resources are implemented as part of the different network-based services.

* * * * *